United States Patent
Lorenzo

(10) Patent No.: US 11,346,582 B2
(45) Date of Patent: May 31, 2022

(54) HEAT EXCHANGE DEVICE

(71) Applicant: Luis López Lorenzo, Almeria (ES)

(72) Inventor: Luis López Lorenzo, Almeria (ES)

( * ) Notice: Subject to any disclaimer, the term of this patent is extended or adjusted under 35 U.S.C. 154(b) by 163 days.

(21) Appl. No.: 16/337,942

(22) PCT Filed: Nov. 7, 2017

(86) PCT No.: PCT/ES2017/070736
§ 371 (c)(1),
(2) Date: Mar. 29, 2019

(87) PCT Pub. No.: WO2018/178414
PCT Pub. Date: Oct. 4, 2018

(65) Prior Publication Data
US 2021/0285690 A1    Sep. 16, 2021

(30) Foreign Application Priority Data
Mar. 30, 2017   (ES) ................. U201700224

(51) Int. Cl.
*F24T 10/17*    (2018.01)
*F28D 7/12*    (2006.01)
*F28F 9/013*    (2006.01)

(52) U.S. Cl.
CPC ............ *F24T 10/17* (2018.05); *F28D 7/12* (2013.01); *F28F 9/013* (2013.01)

(58) Field of Classification Search
CPC ............ F24T 10/17; F28D 7/12; F28F 9/013
USPC ........................................ 165/162
See application file for complete search history.

(56) References Cited

U.S. PATENT DOCUMENTS

| | | | | |
|---|---|---|---|---|
| 2010/0218912 A1* | 9/2010 | Lawless | ................. | C09K 8/467 165/45 |
| 2010/0270003 A1* | 10/2010 | Sarria | ..................... | C02F 1/048 165/45 |
| 2012/0175077 A1* | 7/2012 | Lehmann | ................ | E21B 19/24 165/45 |
| 2014/0116643 A1* | 5/2014 | Xu | .......................... | F24T 10/30 165/45 |
| 2015/0122453 A1* | 5/2015 | Colwell | ................. | F24T 10/30 165/45 |
| 2017/0292792 A1* | 10/2017 | Yokomine | ................ | F28D 7/16 |

FOREIGN PATENT DOCUMENTS

GB    2133524 A  *  7/1984  ............... F28D 7/12

* cited by examiner

*Primary Examiner* — Tho V Duong
(74) *Attorney, Agent, or Firm* — Ashok Tankha

(57) ABSTRACT

A heat exchange device for stabilizing the ambient temperature in large spaces is provided. The heat exchange device comprises an inner tube and an outer tube of rigid material. The outer tube is open at its upper part and closed at its lower part, with a diameter approximately sixty percent greater than the diameter of the inner tube and a length of more than ten meters. The inner tube is also open at its upper part and closed at its lower part, and the perimeter of its lower side has a series of holes. The inner tube is inserted into the outer tube and it has several clamps, which have at least three symmetrical legs located in the perpendicular plane of the axes of the tubes and ending in their respective wheels on free axes. In the upper part of the inner tube an air extractor device is located.

1 Claim, 2 Drawing Sheets

HEAT EXCHANGE DEVICE

CROSS-REFERENCE TO RELATED APPLICATIONS

This application is a national stage application of the Patent Cooperation Treaty (PCT) international application titled "Heat Exchange Device", international application number PCT/ES2017/070736, filed in the European Patent Office on Nov. 7, 2017, which claims priority to and the benefit of the provisional patent application titled "Heat Exchange Device", provisional patent application number U201700224, filed in the European Patent Office on Mar. 30, 2017. The specification of the above referenced patent applications are incorporated herein by reference in their entirety.

BACKGROUND

At present, the existence of some similar air conditioning devices are known. Most air conditioning devices for large volumes refer to costly and complicated air conditioners or even to coal, wood or waste heating devices that need to be transported, stored, placed into the heater and then removed. Among them, the utility model 261.844 can be referred that was already expired, which has some similarities with the present invention, but which refers to an automatic device, different from the invention proposed.

The proposed invention solves all these problems in a simpler and more economical way, without the need for expensive infrastructures, maintenance costs and continuous monitoring. The requestor is currently unaware of the existence of an invention that is endowed with the features and benefits described in this report.

Hence, there is a long felt yet unresolved need for a heat exchange device to stabilise the ambient temperature mainly in large spaces, such as warehouses, greenhouses, industrial buildings, or large halls. More specifically, there is a long felt but unresolved need to stabilize the ambient temperature in large spaces by using the temperature of the soil below the earth's crust to heat the air when the outside temperature is low and to cool the air when the outside temperature is high This invention has an application within the industry of air conditioning and auxiliary boiler making.

SUMMARY OF THE INVENTION

A heat exchange device for stabilizing the ambient temperature in large spaces is provided. The heat exchange device comprises an inner tube and an outer tube of rigid material. The outer tube is open at its upper part and closed at its lower part, with a diameter approximately sixty percent greater than the diameter of the inner tube and a length of more than ten meters. The inner tube is also open at its upper part and closed at its lower part, and the perimeter of its lower side has a series of holes. The inner tube is inserted into the outer tube and it has several clamps, which have at least three symmetrical legs located in the perpendicular plane of the axes of the tubes and ending in their respective wheels on free axes. In the upper part of the inner tube an air extractor device is located.

BRIEF DESCRIPTION OF THE DRAWINGS

To complement the description presented herein and in order to provide for a better understanding of the characteristics of the invention, a sheet of drawings is attached to this descriptive report as an integral part thereof, in which the elements are represented with identical references and where the following is represented, including but not limited to.

DETAILED DESCRIPTION OF THE INVENTION

Figure 1:
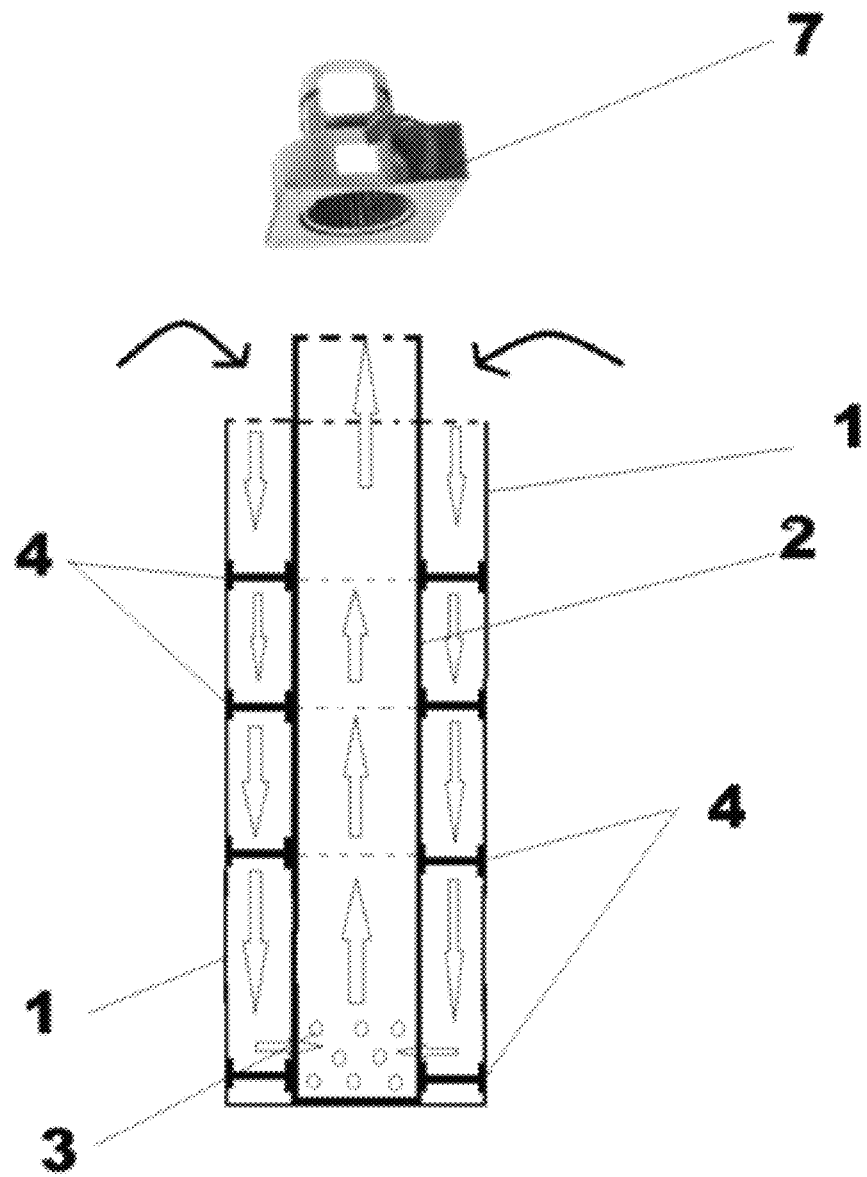
FIG. 1 exemplarily illustrates a schematic side view of the heat exchange device with its component parts.
Figure 2:
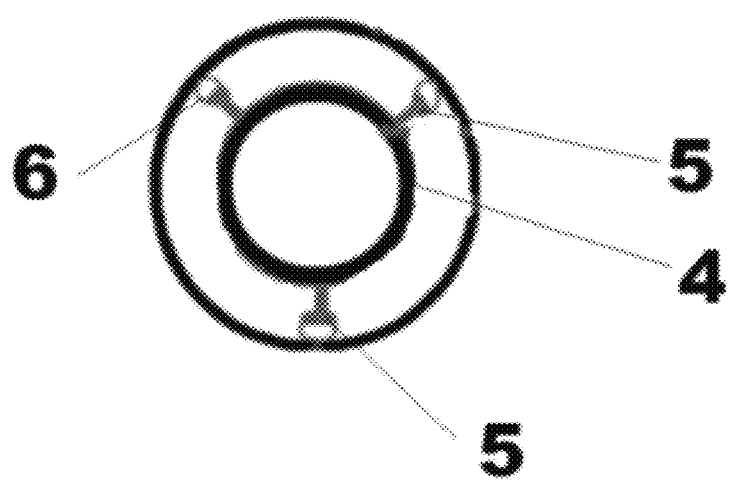
FIG. 2 exemplarily illustrates a schematic plan view of the heat exchange device with its component parts.

FIG. 1 exemplarily illustrate a schematic side view of the heat exchange device with its component parts. The device proposed by the invention incorporates a plurality of novel features in relation to other elements used within the sector. More specifically, the heat exchange device comprises two long tubes of rigid material, an outer tube 1 and an inner tube 2. The heat exchange device further comprises holes 3 of the inner tube 2, clamps 4 of the inner tube 2, legs 5 of the clamp 4, wheels 6, and an air extractor 7.

The outer tube 1 of rigid material is open at its upper part and completely closed at its lower part, with a diameter approximately sixty percent greater than the diameter of the inner tube 2. The inner tube 2 of rigid material, with a length of more than ten meters, is also open at its upper part and closed at its lower part, and the perimeter of its lower side has a series of holes 3.

The inner tube 2 is inserted into the outer tube 1 and, in order for it to be perfectly centered, the inner tube 2 has several clamps 4 distributed along its entire length, and said clamps 4 have at least three symmetrical legs 5, located in the perpendicular plane of the axes of the tubes 1 and 2, ending in their respective wheels 6 on free axes. In the upper part of the inner tube 2 an air extractor device 7 is located.

The operation of the device is very simple. The outer tube 1 is introduced into the ground to a depth of more than ten to twenty meters. Then, the inner tube 2 is inserted inside the outer tube 1. The air extractor 7 is started, which forces the entry of ambient air through the holes 3 of the inner tube 2, which runs through the inside of the outer tube 1 taking the temperature of the subsoil, passing through the holes 3 of the inner tube 2 and exiting by means of the air extractor 7.

The temperature of the subsoil in Europe at a depth of ten meters oscillates between ten/fifteen degrees constant according to the location and, depending on the size of the space to be acclimatised, several devices may be placed, as appropriate. Therefore, the device allows to cool large enclosed spaces at a very good temperature and to maintain a habitable temperature when temperatures are very low outside.

Having sufficiently described the nature of the invention, as well as its operation, it should be noted that the provisions previously indicated and represented in the attached drawings are subject to modifications of details insofar as they do not alter its fundamental principles established in the previous paragraphs and summarised in the following claims.

I claim:

1. A heat exchange device, comprising:
   an outer tube of rigid material open at an upper part of said outer tube and closed at a lower part of said outer tube, wherein said outer tube has a length of more than ten meters and a diameter sixty percent greater than a diameter of an inner tube;
   said inner tube made of rigid material, wherein a length of said inner tube is more than ten meters, wherein said inner tube is open at an upper part of said inner tube and closed at a lower part of said inner tube, and a perimeter of a lower side of said inner tube is has a series of holes;

said inner tube inserted into the outer tube and said inner tube comprising several clamps distributed along the length of the inner tube for centering the inner tube, wherein said clamps comprise three symmetrical legs, located in a perpendicular plane of axes of said inner tube and said outer tube, wherein each of said clamps end with a wheel on free axes; and an extractor device located on said upper part of said inner tube.

\* \* \* \* \*